(12) United States Patent
Froitzheim et al.

(10) Patent No.: US 7,482,921 B2
(45) Date of Patent: Jan. 27, 2009

(54) METHOD AND DEVICE FOR LOCALIZING TRANSPONDERS

(75) Inventors: Herbert Froitzheim, Pettendorf (DE); Matthias Münch, Obertraubling (DE); Dieter Wanger, Laaber (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 11/184,355

(22) Filed: Jul. 19, 2005

(65) Prior Publication Data

US 2006/0012475 A1    Jan. 19, 2006

(30) Foreign Application Priority Data

Jul. 19, 2004    (DE)    ................. 10 2004 034 876

(51) Int. Cl.
*G08B 1/08*    (2006.01)
*H04Q 7/00*    (2006.01)

(52) U.S. Cl. ............... 340/539.21; 340/933; 340/572.1; 340/10.1; 73/146; 455/456.1

(58) Field of Classification Search ................. 340/933, 340/539.21, 539.23, 686.6, 572.1, 10.1, 825.49, 340/825.72; 701/300, 36, 34, 49; 73/146–146.5; 455/456.1–456.6

See application file for complete search history.

(56) References Cited

U.S. PATENT DOCUMENTS

| | | | |
|---|---|---|---|
| 4,609,905 A * | 9/1986 | Uzzo | 340/447 |
| 4,695,823 A * | 9/1987 | Vernon | 340/447 |
| 5,602,524 A | 2/1997 | Moch et al. | |
| 5,883,305 A * | 3/1999 | Jo et al. | 73/146.5 |
| 6,018,993 A * | 2/2000 | Normann et al. | 73/146.5 |
| 6,084,512 A * | 7/2000 | Elberty et al. | 340/572.1 |
| 6,278,363 B1 * | 8/2001 | Bezek et al. | 340/442 |
| 6,369,703 B1 * | 4/2002 | Lill | 340/447 |
| 6,417,766 B1 * | 7/2002 | Starkey | 340/447 |
| 6,571,617 B2 * | 6/2003 | Van Niekerk et al. | 340/447 |
| 6,581,449 B1 * | 6/2003 | Brown et al. | 340/447 |
| 6,591,671 B2 * | 7/2003 | Brown | 340/442 |
| 6,662,642 B2 * | 12/2003 | Breed et al. | 73/146 |
| 6,668,636 B2 * | 12/2003 | Nantz et al. | 340/445 |
| 6,691,567 B2 * | 2/2004 | Walker et al. | 340/447 |
| 6,693,522 B2 * | 2/2004 | Tang et al. | 340/445 |

(Continued)

FOREIGN PATENT DOCUMENTS

DE    102 50 906 A1    5/2004

(Continued)

*Primary Examiner*—George A Bugg
*Assistant Examiner*—Eric M Blount
(74) *Attorney, Agent, or Firm*—Laurence A. Greenberg; Werner H. Stemer; Ralph E. Locher

(57) ABSTRACT

The device and the method enable the localization of transponders, particularly in motor vehicles. A determination of the distance of different transponders from the base station is made possible by evaluating the different request signals and response signals received and also the physical variables contained therein, such as signal level, charging time, and signal propagation delay. As a result of the relative determination of the different distances of the transponders from a base station, it is for example possible to determine the position of wheels of a motor vehicle. This means savings in terms of tire electronics, which require a separate power supply and are technically more complicated and more expensive to use than transponders.

19 Claims, 2 Drawing Sheets

U.S. PATENT DOCUMENTS

| | | | |
|---|---|---|---|
| 6,696,935 B2 * | 2/2004 | Bonardi et al. | 340/447 |
| 6,720,888 B2 * | 4/2004 | Eagleson et al. | 340/572.1 |
| 6,778,075 B2 * | 8/2004 | Headley et al. | 340/443 |
| 6,791,452 B2 * | 9/2004 | Fletcher et al. | 340/10.6 |
| 6,868,073 B1 * | 3/2005 | Carrender | 370/278 |
| 6,897,770 B2 * | 5/2005 | Lill | 340/445 |
| 6,972,671 B2 * | 12/2005 | Normann et al. | 340/442 |
| 7,032,441 B2 * | 4/2006 | Kanatani et al. | 73/146 |
| 7,119,661 B2 * | 10/2006 | Desai et al. | 340/5.61 |
| 7,119,736 B2 * | 10/2006 | Heide et al. | 342/125 |
| 7,200,466 B2 * | 4/2007 | Honda | 700/225 |
| 2002/0116992 A1 * | 8/2002 | Rickel | 73/146 |
| 2003/0001735 A1 * | 1/2003 | Honeck et al. | 340/445 |
| 2003/0197603 A1 * | 10/2003 | Stewart et al. | 340/442 |
| 2004/0246117 A1 * | 12/2004 | Ogawa et al. | 340/445 |

FOREIGN PATENT DOCUMENTS

| | | |
|---|---|---|
| DE | 103 31 314 B3 | 6/2004 |
| EP | 0 861 160 B1 | 4/2000 |
| WO | WO 93/16891 | 9/1993 |
| WO | WO 94/20317 | 9/1994 |
| WO | WO 96/15919 | 5/1996 |
| WO | 97/18962 | 5/1997 |
| WO | WO 97/18962 | 5/1997 |
| WO | 01/12453 A1 | 2/2001 |

* cited by examiner

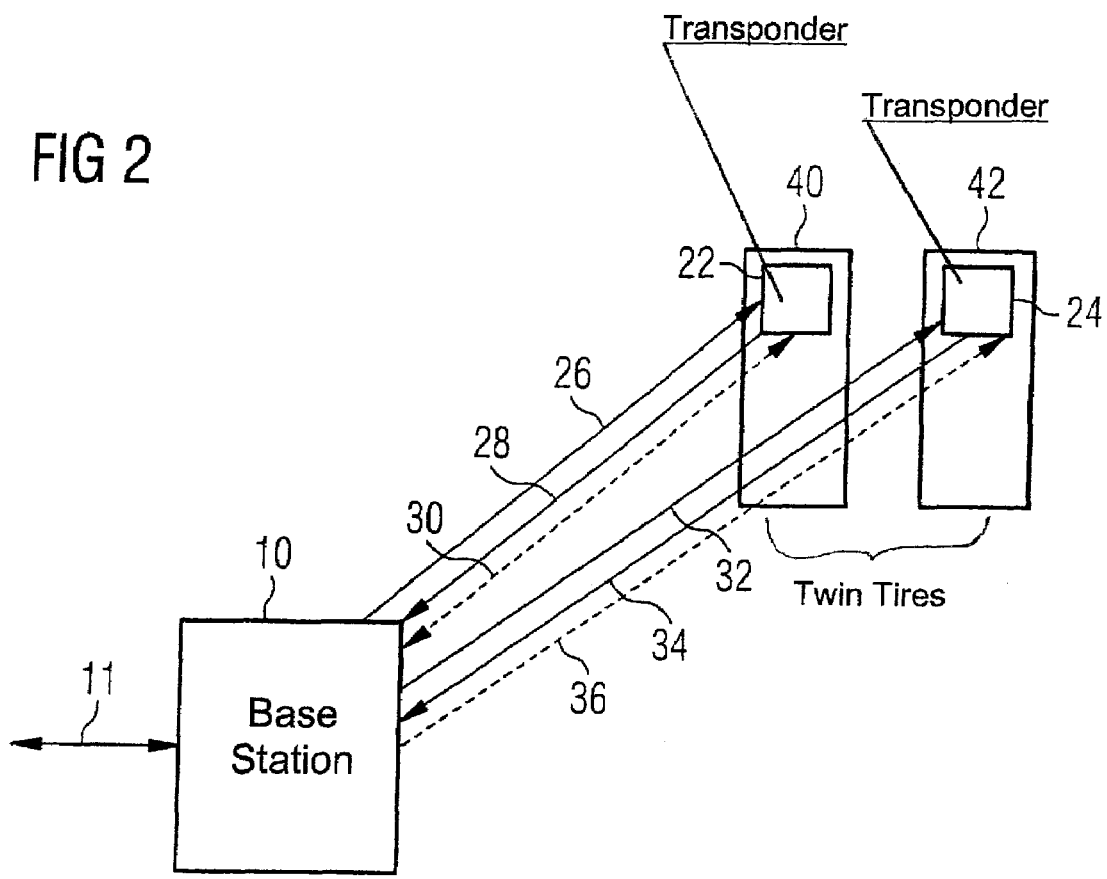

METHOD AND DEVICE FOR LOCALIZING TRANSPONDERS

BACKGROUND OF THE INVENTION

Field of the Invention

The invention relates to a device and a method for localizing transponders, particularly in motor vehicles.

Use is increasingly made in automotive engineering of devices for monitoring state variables for the tires of a motor vehicle. In this situation, locating or localizing the precise situation, location, and position of tires relative to the motor vehicle plays an important role in detecting tire problems, for example the detection of insufficient air pressure in the tire. Particularly in the case of large trucks, not only the indication of a tire problem but also the indication of the particular tire experiencing the problem is of particular importance. If, for example, with regard to a twin-tire arrangement of a truck one of the two tires has an excessively low or an excessively high air pressure, having a knowledge of this fact the truck driver can decide for himself that as a result of the axles which are available and the accompanying axle load distribution it is still possible to travel for a certain period of time and for a certain distance, for example as far as the next workshop. When a tire problem is indicated without a specific reference to the problematic tire, the truck driver would however need to stop immediately for safety reasons, localize the tire concerned and change it if necessary.

European patent EP 0 861 160 B1 (cf. U.S. Pat. No. 6,018, 993) describes a method for assigning transmitters to receive antennas in respect of tire pressure monitoring systems. The method renders it possible to localize tires on a motor vehicle. With regard to this method, the intensities with which the signal from the same transmitter for a particular tire is received by antennas located at different positions in the motor vehicle are registered by a base station in the motor vehicle. The location of the transmitter is then ascertained on the basis of the intensities registered.

These configurations for localizing tires on motor vehicles require transmit and receive electronics and they are therefore technologically complicated and thus expensive. In addition, the transmitters situated in the respective tire require a self-contained, in other words independent, power supply such as an accumulator or a small battery for example.

SUMMARY OF THE INVENTION

It is accordingly an object of the invention to provide a method and device for localizing transponders, and above all passive transponders, which overcome the above-mentioned disadvantages of the heretofore-known devices and methods of this general type and which are very simple to implement from a technological standpoint and are thus as cost-effective as possible.

With the foregoing and other objects in view there is provided, in accordance with the invention, a device for localizing transponders, comprising:
 a first transponder disposed at a first position in an object and configured to provide a first response signal;
 a second transponder disposed at a second position, different from the first position, in the object and configured to provide a second response signal;
 a base station having:
  a transmit/receive device for transmitting a request signal to said first and second transponders and for receiving the first and second response signals in response to the request signal;
  an evaluation device for evaluating the first and second response signal, for comparing the evaluated response signals, and for determining a distance from the base station to said first and second transponders.

With the above and other objects in view there is also provided, in accordance with the invention, a method of localizing transponders, in particular in a motor vehicle, which comprises the following steps:
 (a) sending of a request signal from a base station;
 (b) responding with at least one first response signal by at least one first transponder in response to the request signal;
 (c) responding with at least one second response signal by at least one second transponder, disposed at a different position from the first responder, in response to the request signal;
 (d) evaluating and comparing the at least two response signals received by the base station; and
 (e) determining a distance of the transponders from the base station.

In other words, the invention is based on the fact that transponders are used as transmit and receive units, i.e., transceiver units, within certain defined areas, in particular on or in the wheels of a motor vehicle. In order to enable conclusions to be drawn concerning the position of such a transponder, certain items of information which are contained in a request signal sent to the transponder and/or in a response signal received from the base station are compared with one another and evaluated. The idea on which the present invention is based, given the presence of a plurality of transponders, therefore consists in receiving and evaluating the response signals sent back by these transponders in response to the request signal from the base station. A comparison of the evaluated response signals is then used to determine the distance of the transponders from the base station, which makes it possible to locate and also localize the different transponders. It is thus possible, for example in the case of a motor vehicle, to determine the position of its wheels relative to the base station.

Altogether, this means savings in terms of complicated tire electronics assemblies for determining the position of the tires which require a separate power supply and are technically more complicated and more expensive to use than transponders. Particularly in motor vehicles and above all in trucks it is thus possible to achieve a technically less complicated localization of the wheels.

In accordance with an advantageous embodiment, the evaluation device has a sorting device which determines a sequence of the distances of the transponders from the base station.

By preference, a transponder has at least one first measuring device for performing a level measurement on the request signal and a transmit facility sends back the measured level as a response signal or as part of a response signal to the base station. In this situation, at least one first measuring device is provided in each transponder. During signal level measurement the received signal field strength is ascertained, for example on the basis of its amplitude or its absolute value. In addition or as an alternative, provision can also be made whereby the base station also has at least one second measuring device for performing a level measurement on the response signal from a transponder, with the result that a level measurement of the response signal is thereby possible which avoids the use of level measuring devices on the transponder and thus enables a technically less complicated embodiment of the transponder. In this manner, localization of the transponders can be carried out by means of signal level measurement.

In accordance with a particularly advantageous embodiment, the sorting device is designed in such a manner as to use the level measurement values to determine a sequence of the distances of the transponders from the base station by sorting the level measurement values according to their size in such a manner that the sorting corresponds to the distance sequence of the transponders relative to the base station. During the localization of twin tires it is then possible for example to differentiate between the outer of the twin tires as a result of its greater distance from the base station, which is mounted for example centrally in the motor vehicle, and the inner of the twin tires which is located at a shorter distance from the base station. With regard to conventional localization methods, which for example exclusively use angular information with a directional antenna in order to localize the position of the tires, a precise location or localization process in which twin tires are to be distinguished from one another would not be possible.

In addition or as an alternative, provision can also be made whereby a transponder and in particular a passive transponder comprises at least one third measuring device for measuring a period of time from when the base station starts supplying power to the transponder until a predefined charging limit is reached, and a transmit facility which sends back the value for the measured time period as a response signal or as part of the response signal to the base station. In one embodiment of the device at least this third measuring device is provided in each transponder.

In addition or as an alternative, the base station comprises at least one fourth measuring device for measuring the period of time between sending off the request signal to the transponders and receiving the corresponding response signals from the transponders. In this manner it is possible to localize the transponders by means of propagation delay time measurement. This method offers the advantageous capability of being able to calculate absolute distance values by way of the signal propagation delay measurement.

In a particularly advantageous development of the invention, the sorting device is designed in such a manner as to use the measured time periods to determine a sequence of the distances of the transponders from the base station by sorting the measured time periods according to their size in such a manner that the sorting corresponds to the distance sequence of the transponders relative to the base station.

In a particularly advantageous embodiment, the transponders provide the corresponding response signal with a distinctive identifier which is characteristic of the respective transponder. An identifier characterizing each transponder would make it possible, for example, to unambiguously recognize and identify wheels even when they are in a changed position, such as after a wheel change for example.

In a particularly advantageous embodiment of the method according to the invention, an addressed request signal is used in method step (a). After method step (b) and before method step (c), a further addressed request signal can then be sent out by a base station, wherein the further addressed request signal employs a different form of addressing compared with the addressed request signal in method step (a). The particular advantage of this addressing form and in particular the use of different addressing forms for different transponders or transponder mounting locations consists in the fact that it is always precisely the addressed transponder which is referenced and which returns a response signal.

Other features which are considered as characteristic for the invention are set forth in the appended claims.

Although the invention is illustrated and described herein as embodied in a Method and device for localizing transponders, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagram of a second embodiment of the device according to the invention for determining the distance of transponders with two transponders mounted in twin tires.

DESCRIPTION OF THE PREFERRED EMBODIMENTS

Figure 1:
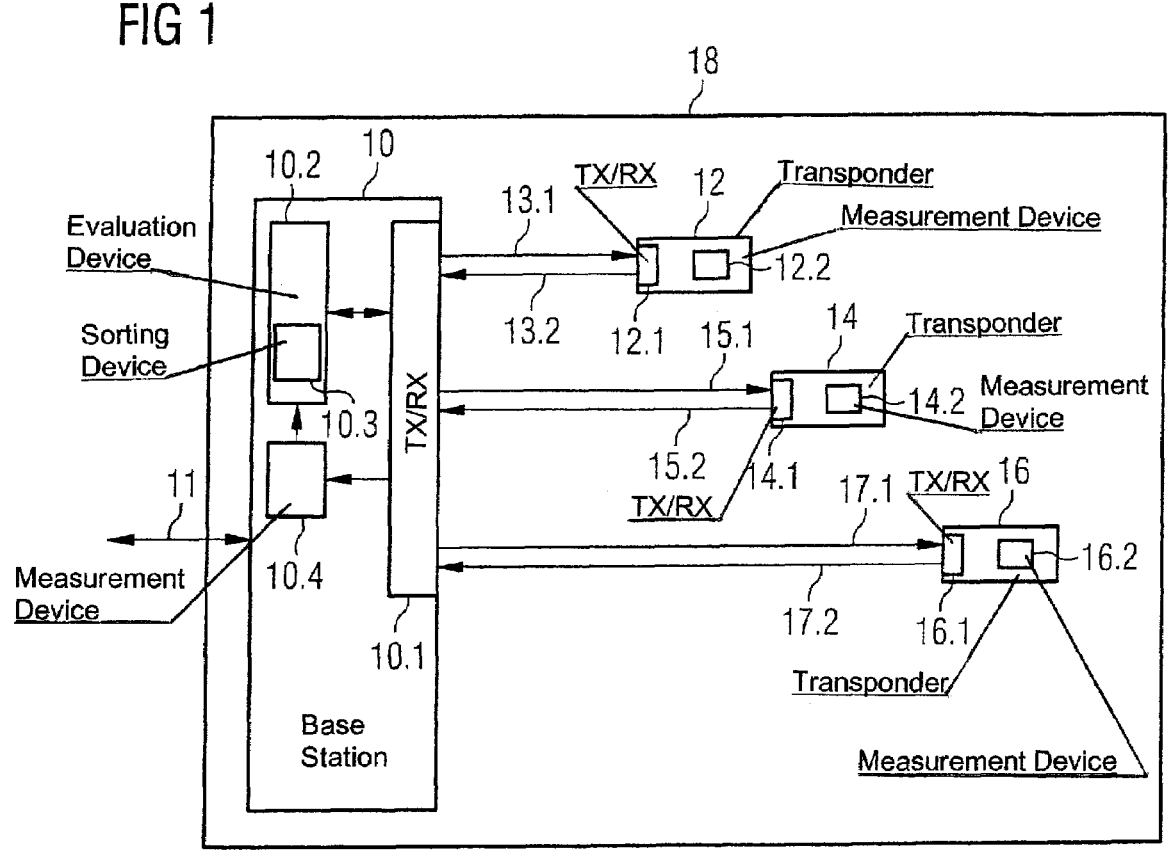
FIG. 1 is a diagram of a first embodiment of the device according to the invention with a base station and a plurality of transponders positioned at different spacing distances from the base station.

Referring now to the figures of the drawing in detail and first, particularly, to FIG. 1 thereof, there is shown a first embodiment of the device according to the invention. A base station 10 and three transponders 12, 14, 16 positioned at different spacing distances from the base station are illustrated in an object 18, which has been indicated by means of different spacings from the base station 10. We will assume, in the following description, that the transponders 12, 14, 16 take the form of passive transponders. We will further assume that the object 18 is a motor vehicle.

A base station 10 comprises a transmit and receive device 10.1, also referred to as a transceiver 10.1, for sending a request signal to the passive transponders 12, 14, 16 and for receiving the corresponding response signals from the passive transponders 12, 14, 16 to the base station 10. In the same manner, each transponder 12, 14, 16 also has a transmit and receive device 12.1, 14.1, 16.1, or transceiver. In FIG. 1, the request signals sent from the base station 10 to the transponders 12, 14, 16 have in each case been provided with the reference characters 13.1, 15.1, 17.1 and the response signals sent back from the transponders 12, 14, 16 to the base station 10 have been provided with the reference characters 13.2, 15.2, 17.2. In addition, the base station 10 contains an evaluation device 10.2 for evaluating the received response signals 13.2, 15.2, 17.2 and for comparing the information contained in the different response signals 13.2, 15.2, 17.2. Furthermore, a sorting device 10.3 is disposed for example in the base station 10 or preferably inside the evaluation device 10.2. The base station 10 also contains a preferably external interface 11 which is used for data communication and in particular for forwarding the knowledge acquired within the framework of the localization process. The base station 10 can be connected by way of the interface 11 for example to a non-illustrated control system, an engine control unit for example. Finally, the base station 10 has a measuring device 10.4. In addition, the transponders 12, 14, 16 also each have a measuring device 12.2, 14.2, 16.2. The measuring devices 10.4, 12.2, 14.2, 16.2 are used for measuring different measurement values, as described in the following in detail in the following on the basis of five exemplary embodiments.

The base station 10 sends out a request signal 13.1, 15.1, 17.1 which is received by all transponders 12, 14, 16. By preference, the request signal is emitted in all directions, in other words to all transponders 12, 14, 16, at the same power level. The transponders 12, 14, 16 receive the request signal 13.1, 15.1, 17.1 from the base station 10 and each send a response signal 13.2, 15.2, 17.2 back to the base station 10. The base station 10 can then, by using the response signals 13.2, 15.2, 17.2 received from the transponders 10, 12, 16 and the information contained in the respective response signal 13.2, 15.2, 17.2, determine the relative distance of the respective transponder 12, 14, 16 from the base station 10.

In the case of the configuration of FIG. 1, the base station 10 would localize the transponder 12 as being positioned closer to the base station 10 than the transponder 14, which in turn is localized as being positioned closer to the base station 10 than the transponder 16. If the transponders 12, 14, 16 are permanently mounted at known positions in the object 18 and unambiguously defined by means of different distances from the base station 10, it is possible to unambiguously determine not only the distance of the transponders 12, 14, 16 from the base station 10 but also the mounting location of the transponders 12, 14, 16 within the object 18.

In a first embodiment, the transponders 12, 14, 16 measure the field strength level of the received request signal 13.1, 15.1, 17.1, for example by using RSSI (Received Signal Strength Indicator), and send a response signal 13.2, 15.2, 17.2 back to the base station 10 as a measure of the measured signal level. The measured signal level is here a measure of the distance of the respective transponders 12, 14, 16 from the base station 10. Transponder 12, which is mounted closest to the base station 10, therefore receives a request signal 13.1 with a higher signal field strength level and thus a higher power level than is the case with the two other more distantly mounted transponders 14 and 16. The base station 10 receives the corresponding response signals 13.2, 15.2, 17.2 from the transponders 12, 14, 16, compares the different measured power levels of the response signals 13.2, 15.2, 17.2 from the respective transponders 12, 14, 16 with one another and ascertains from this a sequence in relation to the distance of the transponders 12, 14, 16 from the base station 10.

In a second embodiment, the base station 10 sends a request signal 13.1, 15.1, 17.1 to the transponders 12, 14, 16, which in turn send back a response signal 13.2, 15.2, 17.2 to the base station 10. The base station 10 receives the respective response signals 13.2, 15.2, 17.2 and measures their field strength levels, for example by using RSSI (RSSI=Received Signal Strength Indicator). The base station 10 will then measure a higher level for the response signal 13.2 for transponder 12 than for transponders 14, 16 because transponder 12 is positioned closest to the base station 10. By analogy with this, the base station 10 will measure a higher signal field strength level for the response signal 15.2 for transponder 14 than for transponder 16 because transponder 14 is positioned closer to the base station 10 than transponder 16. This means that the base station 10 can assign to the transponders 12, 14, 16 a sequence in relation to the distances from one another which corresponds to the sequence of the measured field strength levels of the response signals 13.2, 15.2, 17.2.

In a third embodiment, an initial assumption is made that all the transponders 12, 14, 16 have an identical or at least the same structure, such that their charging capacitors which are required for example for supplying power to the respective passive transponder 12, 14, 16 are similarly dimensioned. According to this method, the transponders 12, 14, 16 measure the period of time from when the base station 10 starts supplying power to the transponder 12, 14, 16 until a predefined charging limit is reached for the charging capacitor and send the information about the measured period of time back to the base station 10 as a response signal 13.2, 15.2, 17.2 or as part of the response signal 13.2, 15.2, 17.2. The charging time is here a measure of the distance of the respective transponders 12, 14, 16 from the base station 10. Transponder 12 will typically be the first to reach the charging limit because it is mounted closer to the base station 18 than the two other transponders 14, 16 and thus requires the shortest time for charging the charging capacitor. Transponder 14 will be the next to reach the charging limit. The latter's charging time will be greater than that of transponder 12. Transponder 16 is located at the greatest distance from the base station 10 and therefore requires the greatest charging time compared with the two other transponders 12, 14. In this case too, the base station 10 determines a sequence on the basis of the measured charging times which corresponds to a sequence of distances.

In a fourth embodiment, the base station 10 measures the time which elapses between sending out the request signal 13.1, 15.1, 17.1 to the transponders 12, 14, 16 and receiving the response signals 13.2, 15.2, 17.2 from the transponders 12, 14, 16. The propagation delay time is here a measure of the distance of the respective transponders 12, 14, 16 from the base station 10. The signal propagation delay from transponder 12 is the shortest because it is positioned closer to the base station 10 than transponders 14, 16. Transponder 14 has a longer signal propagation delay than transponder 12, but a shorter signal propagation delay than transponder 16. In this case too, the base station 10 can determine a distance sequence which corresponds to the sequence of the measured signal propagation delays.

In addition, the base station 10 can use the measured signal propagation delays and the known signal frequency to also calculate the absolute distances of the individual transponders 12, 14, 16 from the base station 10.

In a fifth embodiment, an initial assumption is made that all the transponders 12, 14, 16 have a charging capacitor which is over-dimensioned for the function of the transponders 12, 14, 16 and which typically cannot be completely charged up by the electrical field of the signals sent by the base station 10. According to this method, the transponders 12, 14, 16 measure the maximum or absolute charging level of the charging capacitor and send the information about the measured charging level back to the base station 10 as a response signal 13.2, 15.2, 17.2. The absolute value of the charging level is here a measure of the distance of the respective transponders 12, 14, 16 from the base station 10. Transponder 12, which is located closest to the base station 10, then typically exhibits the highest absolute charging level whereas the most distant transformer 16 exhibits the lowest absolute charging level. In this case too, the base station 10 determines a sequence on the basis of the measured charging levels of the different transformers 12, 14, 16, which corresponds to a distance sequence.

With regard to all the methods presented above, it is possible to carry out not only a distance determination but also a localization of the transponders if the transponders 12, 14, 16 are permanently mounted at a particular position in the object 18 and are unambiguously defined by means of different distances from the base station 10.

It is particularly advantageous if the different methods set down above or at least certain of these methods are combined with one another in order to determine the mounting location of, and thus to localize, a particular transponder 12, 14, 16.

FIG. 2 shows a second embodiment of the device according to the invention. The device according to the invention in FIG. 2 comprises a base station 10 and two transponders 22, 24. Each of the transponders 22, 24 is assigned to a twin tire 40, 42 such that the two transponders 22, 24 are configured for determining the location of twin tires 40, 42. The transponders 22, 24 are for example permanently mounted on the twin tires 40, 42 such that their position is unambiguously defined by different distances from the base station 10—as described in detail above with reference to FIG. 1.

The base station 10 sends a request signal 26, 32 to the transponders 22, 24. The two request signals 26, 32 are in this case identical and are preferably sent out at the same point in time. Transponder 22, which is mounted on the inner twin tire 40, sends a response signal 28 back to the base station 10. Transponder 24, which is mounted on the outer twin tire 42, sends another response signal 34 back to the base station 10. Depending on the implementation, a physical variable such as the power level or field strength level of the request signal, power level of the response signal, charging time, charging level or signal propagation delay is evaluated by the base station 10 as a measure of the distance of the transponders 22, 24 from the base station 10. The evaluation in the base station 10 yields the result that transponder 22 is positioned closer to the base station 10 than transponder 24. Transponder 22 must therefore be mounted on the inner twin tire 40. The tire ID and/or the tire status data which for example are additionally contained in the response signal 28 from transponder 22 can thus be assigned unambiguously to the inner twin tire 40. The tire ID and/or the tire status data which are contained in the response signal 34 from transponder 24 can thus be assigned unambiguously to the outer twin tire 42.

Although the present invention has been described above with reference to a preferred embodiment, it is not restricted to this embodiment but can be modified in a great variety of ways.

In particular, the invention is not restricted to use for localizing motor vehicle tires or transponders contained therein but can also be used as desired in other applications, even though the invention is particularly advantageous for localizing transponders in motor vehicle tires.

The invention is also not restricted to passive transponders but can also be advantageously employed with regard to active or semi-active transponders.

The invention is also not restricted to the specific construction of a device for localization, such as is illustrated in FIGS. 1 and 2. This construction should rather be regarded only as an example. In particular, it is naturally also possible to provide a greater or lesser number of transponders. Furthermore, it would also be conceivable for the base station or parts of the functional units contained therein, such as the sorting device and/or the evaluation device for example, to be located at any other desired position in the object or the motor vehicle, for example in another control device such as the engine control unit or in a safety facility.

This application claims the priority, under 35 U.S.C. § 119, of German patent application No. 10 2004 034 876.6, filed Jul. 19, 2004; the entire disclosure of the prior application is herewith incorporated by reference.

We claim:

1. A device for localizing transponders, comprising:
   a first transponder disposed at a first position in an object and configured to provide a first response signal in response to a request signal;
   a second transponder disposed at a second position, different from the first position, in the object and configured to provide a second response signal in response to the request signal; and
   a base station having:
      a transmit/receive device for transmitting a request signal to said first and second transponders and for receiving the first and second response signals from said first and second transponders, respectively;
      an evaluation device for evaluating the first and second response signal, for comparing field strength information associated with the evaluated response signals to one another, and for determining a distance from the base station to said first and second transponders based on the comparison of the evaluated response signal;
   said first transponder assigned to a first tire mounted on an axle, and said second transponder assigned to a second tire mounted on the axle.

2. The device according to claim 1, wherein said second transponder is one of a plurality of transponders each configured to provide a response signal in response to the request signal.

3. The device according to claim 1, wherein said evaluation device includes a sorting device for determining a sequence of distances of said transponders from said base station.

4. The device according to claim 3, wherein at least one of the following is true:
   each of said transponders comprises at least one measuring device for performing a level measurement of the request signal and a transmit device for returning a measured level as a response signal or as part of a response signal to said base station;
   said base station comprises at least one measuring device for performing a level measurement of the response signal from a respective said transponder.

5. The device according to claim 1, wherein each of said transponders comprises at least one first measuring device for performing a level measurement of the request signal and a transmit device for returning a measured level as a response signal or as part of a response signal to said base station, and/or said base station comprises at least one measuring device for performing a level measurement of the response signal from a respective said transponder.

6. The device according to claim 5, wherein said evaluation device includes a sorting device for determining a sequence of distances of said transponders from said base station, and said sorting device is configured to use the level measurement values to determine a sequence of the distances of said transponders from said base station by sorting the level measurement values according to size values thereof such that a sorting corresponds to the distance sequence of said transponders relative to said base station.

7. The device according to claim 5, wherein at least one of said transponders includes at least one further measuring device for measuring a period of time from when said base station starts supplying power to said transponder until a predefined charging limit is reached, and a transmit device for sending back a value for the measured time period as a response signal or as part of the response signal to said base station, and/or said base station comprises at least one further measuring device for measuring a period of time between sending off the request signal to said transponders and receiving the corresponding response signals from said transponders.

8. The device according to claim 1, wherein at least one of the following is true:

each of said transponders includes a measuring device for measuring a period of time from when said base station starts supplying power to said transponder until a predefined charging limit is reached, and a transmit device for returning a value for the measured time period as a response signal or as part of the response signal to said base station; and said base station includes a measuring device for measuring a period of time between transmitting the request signal to said transponders and receiving the corresponding response signals from said transponders.

9. The device according to claim 8, wherein said evaluation device includes a sorting device for determining a sequence of distances of said transponders from said base station, and said sorting device is configured to use the measured time periods to determine a sequence of the distances of said transponders from said base station by sorting the measured time periods according to size such that the sorting corresponds to the distance sequence of said transponders relative to said base station.

10. The device according to claim 1, wherein said transponders are configured to provide the response signal with an identifier characteristic of the respective said transponder.

11. The device according to claim 1, wherein said transponders and said base station are mounted to a motor vehicle.

12. A method of localizing transponders disposed at mutually different locations in an object, which comprises the following steps:
   (a) sending of a request signal from a base station;
   (b) responding with at least one first response signal by at least one first transponder in response to the request signal;
   (c) responding with at least one second response signal by at least one second transponder, disposed at a different location from the first responder, in response to the request signal;
   (d) receiving and evaluating the at least two response signals received by the base station; and
   (e) comparing field strength information associated with the first and second response signals with one another and determining a distance of the transponders from the base station based on the comparison;
   wherein the first transponder is assigned to a first tire mounted on an axle, and the second transponder is assigned to a second tire mounted on the axle.

13. The method according to claim 12, which comprises localizing transponders in a motor vehicle.

14. The method according to claim 12, which comprises using an addressed request signal in method step (a), then transmitting a further addressed request signal by a base station after method step (b) and before method step (c), with the further addressed request signal having different addressing compared with the addressed request signal in method step (a).

15. The method according to claim 12, which comprises carrying out at least one of the following steps:

measuring, with at least one transponder, levels of the request signal and sending back a measured level as a response signal to the base station; and measuring, with the base station, levels of each response signal received from the transponders.

16. The method according to claim 15, which comprises using, with the base station, measured levels to determine a sequence of distances of the transponders from the base station by sorting level measurement values according to a size thereof such that the sorting corresponds to the distance sequence of the transponders from the base station.

17. The method according to claim 12, which comprises carrying out at least one of the following steps:

measuring, with at least one transponder, a period of time from when the base station starts supplying power until a predefined charging limit is reached for a charging capacitor in the transponder, and sending the measured period of time as a response signal back to the base station; and measuring, with the base station, a period of time between sending a request signal to the transponders and receiving the corresponding response signals from the transponders.

18. The method according to claim 17, which comprises using the measured time periods in the base station to determine a sequence of the distances of the transponders from the base station by sorting the measured time periods according to a value thereof such that the sorting corresponds to a distance sequence of the transponders from the base station.

19. A device for localizing transponders, comprising:
   a first transponder disposed at a first position in an object and configured to provide a first response signal in response to a request signal;
   a second transponder disposed at a second position, different from the first position, in the object and configured to provide a second response signal in response to the request signal; and
   a base station having:
      a transmit/receive device for transmitting a request signal to said first and second transponders and for receiving the first and second response signals from said first and second transponders, respectively;
      an evaluation device for evaluating the first and second response signal, for comparing the evaluated response signals to one another, and for determining a distance from the base station to said first and second transponders based on the comparison of the evaluated response signal;
   wherein at least one of said transponders includes at least one further measuring device for measuring a period of time from when said base station starts supplying power to said transponder until a predefined charging limit is reached, and a transmit device for sending back a value for the measured time period as a response signal or as part of the response signal to said base station.

* * * * *